United States Patent
Qiu et al.

(10) Patent No.: US 10,943,332 B2
(45) Date of Patent: Mar. 9, 2021

(54) IMAGE ADJUSTMENT METHOD AND ASSOCIATED IMAGE PROCESSING CIRCUIT FOR IMAGE QUALITY IMPROVEMENT

(71) Applicant: Realtek Semiconductor Corp., HsinChu (TW)

(72) Inventors: Zhong-Yi Qiu, Taichung (TW); Wen-Tsung Huang, Chiayi (TW)

(73) Assignee: Realtek Semiconductor Corp., HsinChu (TW)

( * ) Notice: Subject to any disclaimer, the term of this patent is extended or adjusted under 35 U.S.C. 154(b) by 83 days.

(21) Appl. No.: 16/546,237

(22) Filed: Aug. 20, 2019

(65) Prior Publication Data
US 2020/0265558 A1    Aug. 20, 2020

(30) Foreign Application Priority Data
Feb. 19, 2019 (TW) ................... 108105422

(51) Int. Cl.
*G06K 9/00* (2006.01)
*G06T 5/00* (2006.01)
(Continued)

(52) U.S. Cl.
CPC ........... *G06T 5/003* (2013.01); *G06T 7/11* (2017.01); *G06T 7/90* (2017.01); *H04N 5/332* (2013.01);
(Continued)

(58) Field of Classification Search
CPC ........ H04N 1/40012; H04N 1/40018; H04N 1/40025; H04N 1/40031; H04N 1/40037;
(Continued)

(56) References Cited

U.S. PATENT DOCUMENTS

2010/0289885 A1  11/2010 Lu
2016/0057399 A1*  2/2016 Holub ................ G03B 27/547
                                                         348/223.1
(Continued)

FOREIGN PATENT DOCUMENTS

| CN | 105845077 A | 8/2016 |
| TW | 201836343 A | 10/2018 |
| TW | 201907180 A | 2/2019 |

OTHER PUBLICATIONS

Zhong-Yi Qiu et al., Title of Invention: Image Adjustment Method and Associated Image Processing Circuit, U.S. Appl. No. 16/546,311, filed Aug. 21, 2019.

*Primary Examiner* — Duy M Dang
(74) *Attorney, Agent, or Firm* — Winston Hsu

(57) ABSTRACT

An image adjustment method includes: receiving an image, and retrieving R, G and B values and an infrared ray (IR) value from the image; dividing the image into a plurality of blocks; generating initial compensation coefficients respectively corresponding to the R, G, B and IR values for each block within the blocks; and performing following operations upon each block within the blocks: adjusting initial compensation coefficients of a current block according to a plurality of adjacent blocks next to the current block, in order to generate adjusted compensation coefficients of the current block; and using the adjusted compensation coefficients of the current block to perform IR crosstalk compensation upon the current block.

18 Claims, 5 Drawing Sheets

(51) Int. Cl.
*G06T 7/11* (2017.01)
*G06T 7/90* (2017.01)
*H04N 5/33* (2006.01)

(52) U.S. Cl.
CPC ............ *G06T 2207/10024* (2013.01); *G06T 2207/10048* (2013.01); *G06T 2207/20021* (2013.01)

(58) Field of Classification Search
CPC ............ H04N 1/40043; H04N 1/4005; H04N 1/40056; H04N 1/40062; H04N 1/40068; H04N 1/40075; H04N 19/00024; H04N 19/00139; H04N 19/00315; H04N 19/00448; H04N 9/646; H04N 9/0451; H04N 17/002; H04N 17/02; H04N 5/332; H04N 9/04515; H04N 9/04553; G06T 5/003; G06T 7/11; G06T 7/90; G06T 2207/10024; G06T 2207/20021; G06T 2207/10048; G06T 5/50
See application file for complete search history.

(56) References Cited

U.S. PATENT DOCUMENTS

2016/0225319 A1 8/2016 Lee
2017/0330347 A1* 11/2017 Ogatsu .................. G06K 9/036

* cited by examiner

IMAGE ADJUSTMENT METHOD AND ASSOCIATED IMAGE PROCESSING CIRCUIT FOR IMAGE QUALITY IMPROVEMENT

BACKGROUND OF THE INVENTION

1. Field of the Invention

The present invention relates to an image compensation technique, and more particularly, relating to techniques for compensating infrared (IR) crosstalk. The present invention is applicable to an RGB-IR sensor, which can automatically calculate suitable IR crosstalk compensation parameters based on the symmetry of the sensor and the lens.

2. Description of the Prior Art

Considering the existence of IR component in the ambient light, IR pixels in the hybrid R, G, B and IR filter array are utilized to absorb light. However, the crosstalk effects may occur in the RGB-IR spectrum, as shown in FIG. 2. The occurrence of the overlaps in FIG. 2 is caused mainly by the interference between the IR light and the RGB light. Conventional sensor manufacturing techniques so far are still unable to block or absorb non-color signals. Hence, when containing high IR component of light energy, the color of the object can be influenced by the IR crosstalk effect and thereby causes the color washout effect might occur on the color of the image of an object, such as color shifting. Further, the IR light may be oozed from a facial recognition system of a video system, or from yellowish light (such as a halogen lamp).

The document US20100289885A1 discloses compensating the IR crosstalk by deducting a certain proportion of IR value from each of the R, G and B values, respectively. The equations are shown as follows:

$R_{new} = R_{ori} - k1 \times IR_{ori}$ $G_{new} = G_{ori} - k2 \times IR_{ori}$ $B_{new} = B_{ori} - k3 \times IR_{ori}$ $IR_{new} = IR_{ori}$ wherein $R_{new}$, $G_{new}$, $B_{new}$ and $IR_{new}$ are the adjusted R, G and B values and the IR value respectively, $R_{ori}$, $G_{ori}$, $B_{ori}$ and $IR_{ori}$ are the original R, G and B values and the IR value respectively, and k1, k2 and k3 are constants set by the user according to the influence of the IR crosstalk. This related art, however, merely roughly cancels a slight amount of the influence introduced by the infrared ray rather than adjusting based on the actual influence, and thus may cause overcompensation or distortion in R, G, B colors.

Further, the aforementioned technique exerts the same amount of compensation on all pixels in the frame. Since the influence caused by the infrared ray is non-uniform on the entire frame, the compensated image will be unpleasantly unnatural. Hence, there is a need for a novel method to solve the above problem without introducing side effects.

SUMMARY OF THE INVENTION

An embodiment of the present invention provides an image adjustment method. The image adjustment method comprises: receiving an image, and retrieving R, G and B values and an infrared ray (IR) value from the image; dividing the image into a plurality of blocks; generating initial compensation coefficients respectively corresponding to the R, G, B and IR values for each block within the blocks; and performing following operations upon each block within the blocks: adjusting initial compensation coefficients of a current block according to a plurality of adjacent blocks next to the current block, in order to generate adjusted compensation coefficients of the current block; and using the adjusted compensation coefficients of the current block to perform IR crosstalk compensation upon the current block.

An embodiment of the present invention provides an image processing circuit. The image processing circuit comprises a storage unit and a processor. The storage unit is arranged to temporarily store data. The processor is arranged to perform following operations: receiving an image, and obtaining R, G, B and IR values from the image; dividing the image into multiple blocks; generating initial compensation coefficients respectively corresponding to the R, G and B values for each block within the blocks; and performing following operations upon each block within the blocks respectively: adjusting an initial compensation coefficient of a current block according to respective initial compensation coefficients of multiple adjacent blocks surrounding the current block, in order to generate adjusted compensation coefficients of the current block; and using the adjusted compensation coefficients of the current block to perform IR crosstalk compensation upon the current block.

These and other objectives of the present invention will no doubt become obvious to those of ordinary skill in the art after reading the following detailed description of the preferred embodiment that is illustrated in the various figures and drawings.

DETAILED DESCRIPTION

Some phrases in the present specification and claims refer to specific elements; however, please note that the manufacturer might use different terms to refer to the same elements. Further, in the present specification and claims, the term "comprising" is open type and should not be viewed as the term "consists of." The term "electrically coupled" can refer to either direct connection or indirect connection between elements. Thus, if the specification describes that a first device is electrically coupled to a second device, the first device can be directly connected to the second device, or indirectly connected to the second device through other devices or means.

When the quality of the lens of a camera or an image sensor is not good enough, asymmetry might occur in IR crosstalk. The asymmetry might occur from either the left to the right or from the top to the bottom, or even both if the situation is severe. This makes the IR crosstalk compensation parameters used in related art methods unable to compensate the introduced IR crosstalk properly, or in a way without introducing a side effect.

In view of this, the present invention provides a grid-based IR crosstalk compensation method, in which the IR crosstalk is compensated region by region. More particularly, even if an image suffers from severe IR crosstalk asymmetries, the entire image can still be properly compensated by the present invention. Comparatively, related art techniques compensate an image by deducting the same proportion of IR values from the image (i.e. all pixels in the image) without considering the above factor, making the overall image show non-uniform colors.

Figure 1:
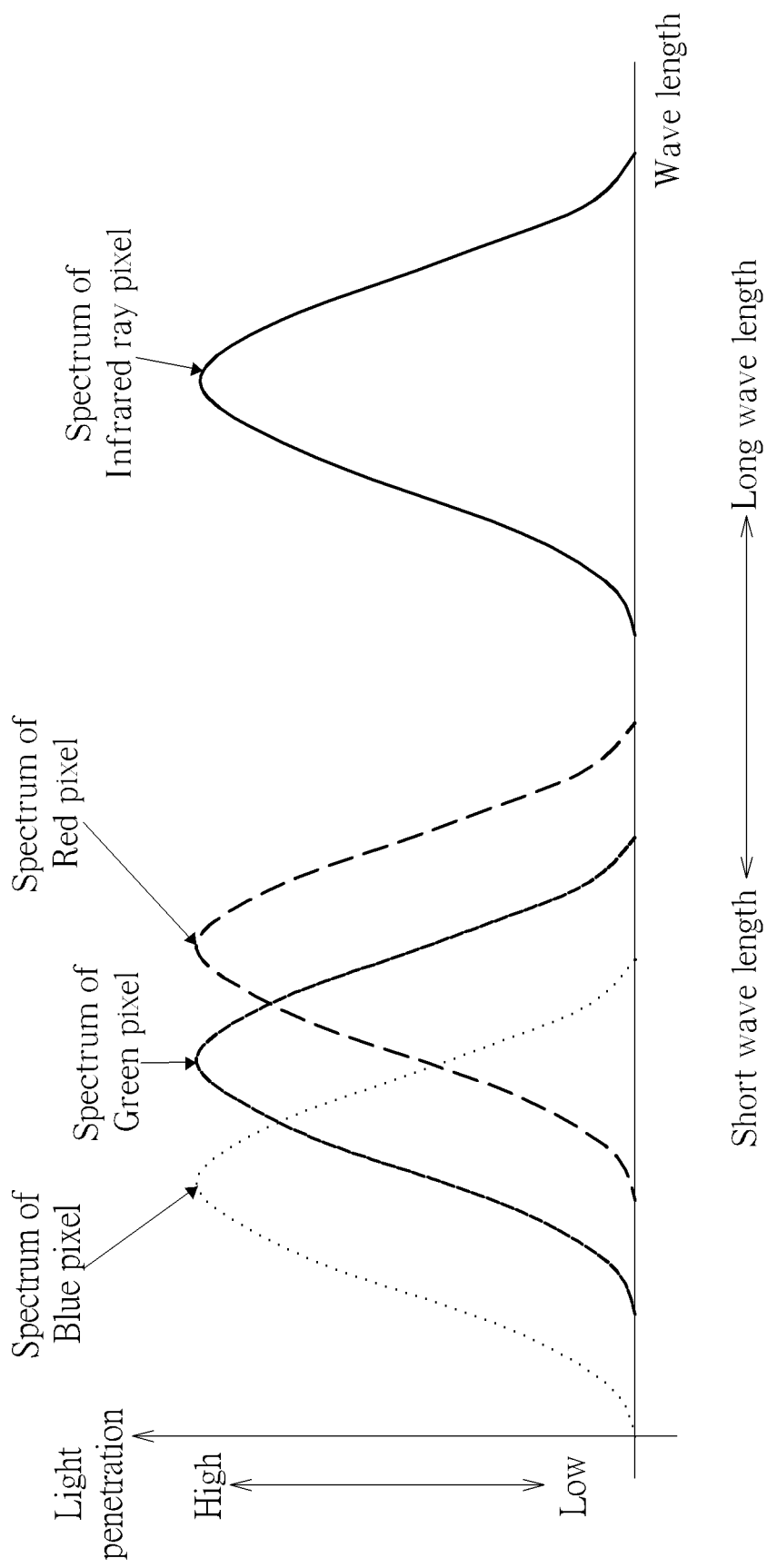
FIG. 1 is the spectrum under an ideal state.
Figure 2:
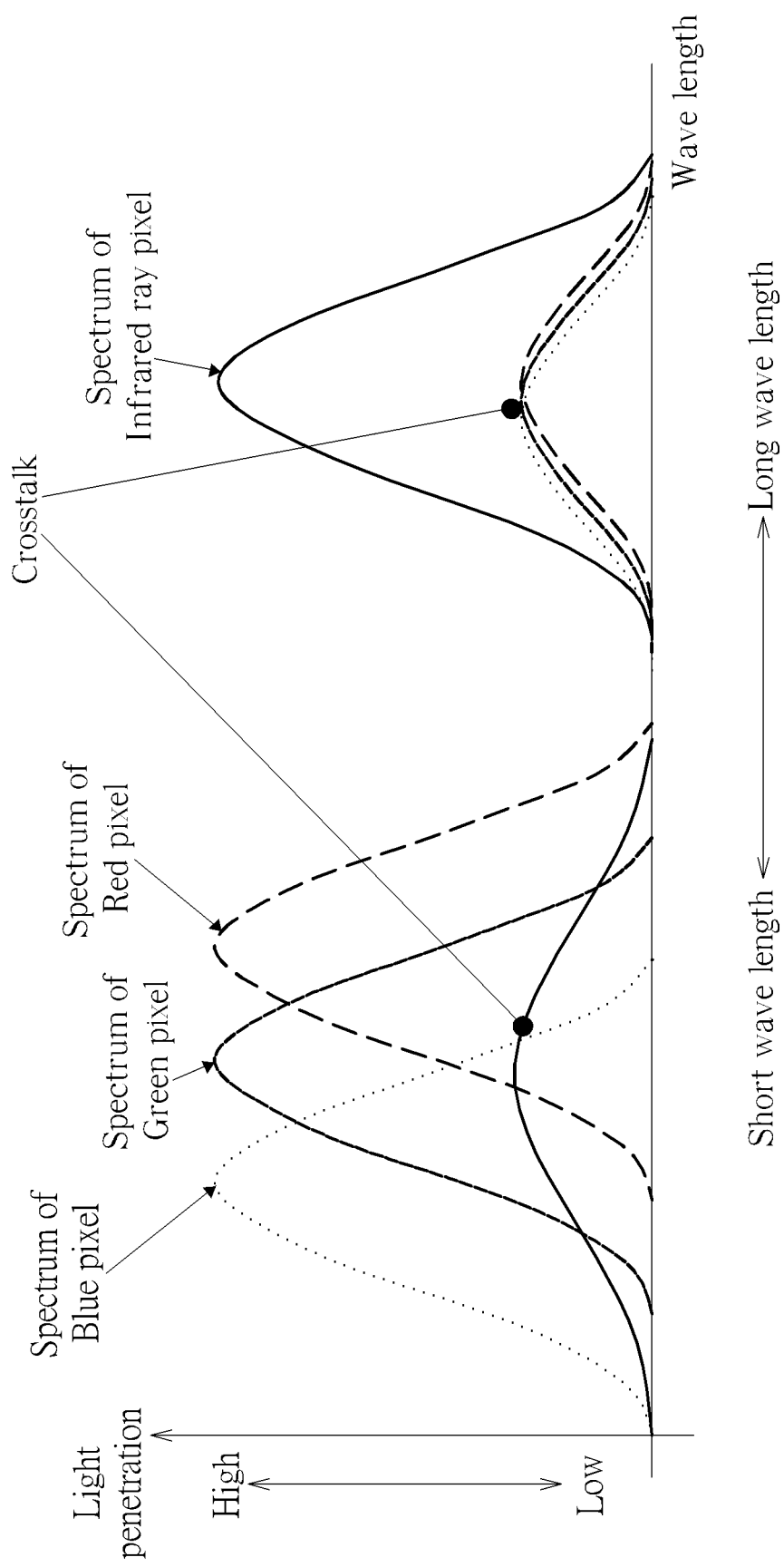
FIG. 2 is a diagram showing a spectrum that explains the crosstalk effect.
Figure 3A:
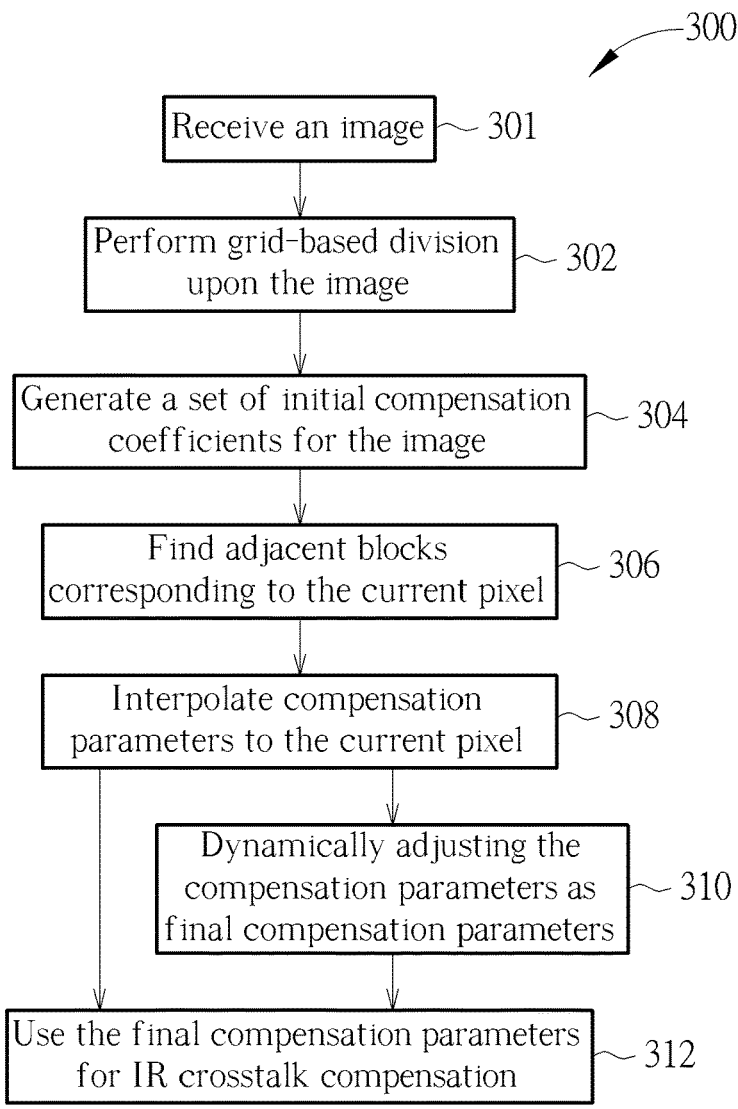
FIG. 3A a flowchart illustrating an image compensation method according to an embodiment of the present invention.
Figure 3B:
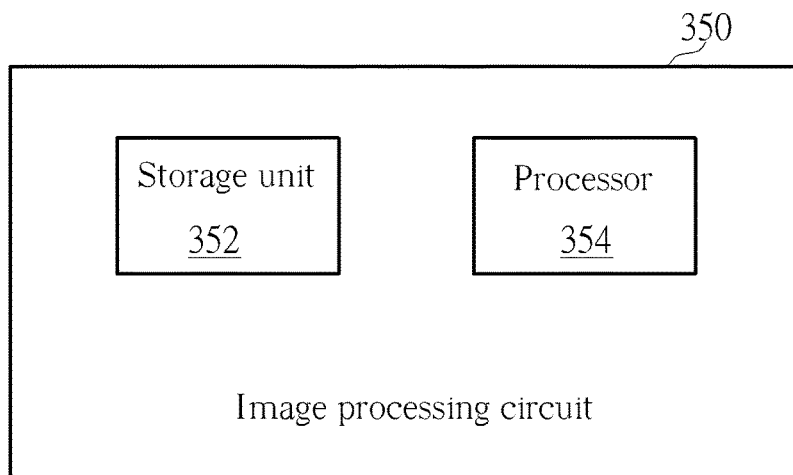
FIG. 3B is a flowchart illustrating an image processing circuit corresponding to FIG. 3A according to an embodiment of the present invention.

Please refer to FIG. 3A, which is a flowchart illustrating an image compensation method 300 according to an embodiment of the present invention. If the result is substantially the same, the execution order of the steps can be different as that shown in FIG. 3A. Further, the method shown in FIG. 3A can be adopted by the image processing circuit 350, wherein the image processing circuit 350 comprises a storage unit 352 and a processor 354. The storage unit 352 is arranged to temporarily store data, and the processor 354 is arranged to execute the image compensation method 300 and various related computations. The image compensation method 300 may be summarized as follows:

Step 301: Receive an image.
Step 302: Perform grid-based division upon the image.
Step 304: Generate a set of initial compensation coefficients for the image.
Step 306: Find adjacent blocks corresponding to the current pixel.
Step 308: Interpolate compensation parameters to the current pixel.
Step 310: Dynamically adjusting the compensation parameters as final compensation parameters (this step can be optional, based on actual needs).
Step 312: Use the final compensation parameters for IR crosstalk compensation.

The present invention provides a calibration method for compensation parameters, which obtains suitable IR crosstalk compensation parameters via pre-calibrating, and performing the IR crosstalk compensation via the calibrated compensation parameters. In the calibration, a flat black card which can reflect the IR ray can be used. The IR ray is emitted on the card when the card is ready, for filming the image of the card. This image can be used for compensation parameters calibrations, and the IR, R, G and B images affected by the IR ray can be respectively obtained via filming the card. This calibration method may be applied to Step 304 to obtain a more accurate result, but the compensation parameters calibration method of the present invention is not limited to the above.

Figure 4:
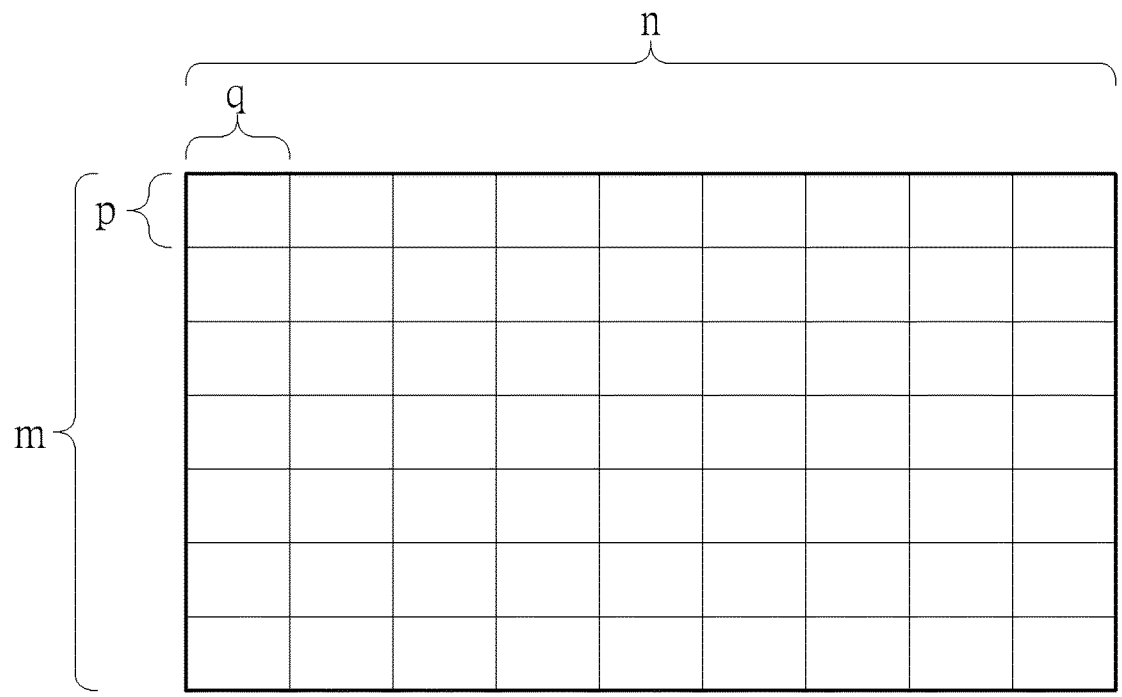
FIG. 4 is a diagram illustrating performing grid-division upon an image according to an embodiment of the present invention.

To be more specific, Step 302 can be referred to FIG. 4. FIG. 4 is a diagram illustrating performing grid-division upon an image according to an embodiment of the present invention, wherein the image are divided into m×n blocks, and the size of each block is p×q.

An example of obtaining compensation parameters of each block may comprise: calculating the R, G, B and IR values of a block Block(i, j) to obtain the mean values Ravg(i, j), avg(i, j), Bavg(i, j), IRavg(i, j) corresponding to the block respectively, wherein i, j are index values of the block Block(i, j) (which represents the i-th row, j-th column block). Regarding the way of obtaining theses values can be referred to the descriptions in Step 302. The equations of obtaining IR crosstalk compensation parameters of R, G, B are as follows:

$$k1(i,j) = A \times Ravg(i,j)/IRavg(i,j)$$

$$k2(i,j) = A \times Gavg(i,j)/IRavg(i,j)$$

$$k3(i,j) = A \times Bavg(i,j)/IRavg(i,j)$$

wherein k1(i, j), k2(i, j) and k3(i, j) are IR crosstalk compensation parameters of R, G, B of the block Block(i, j) respectively, and A is a compensation calibration coefficient (which is ranging from 0~1 floating point number, and may be modified according to different modules), which can be modified according to actual design needs.

Figure 5:
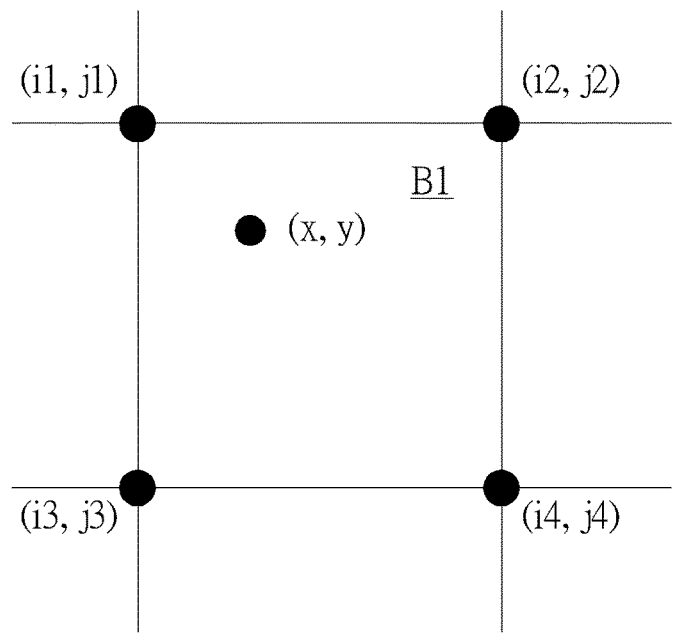
FIG. 5 shows the spatial relationship between the specific block B1 and adjacent blocks.
Figure 6:
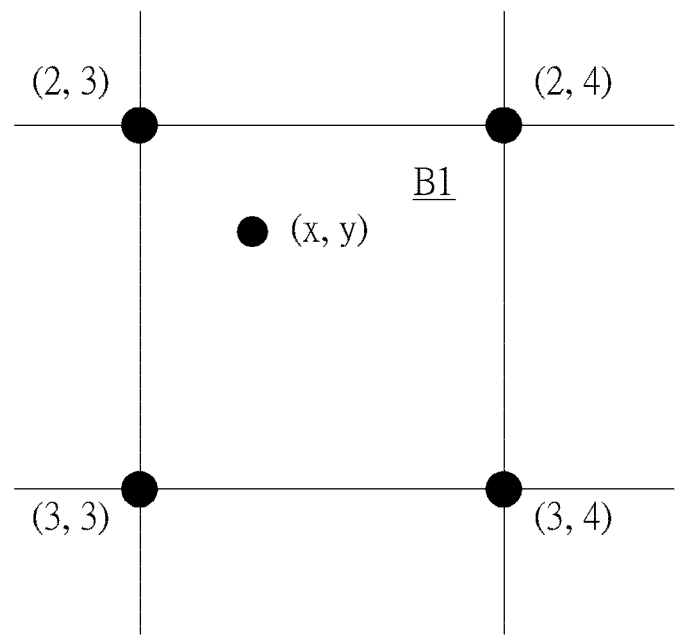
FIG. 6 shows an embodiment corresponding to FIG. 5.

Specific implementations of Step 306 may be referred to FIG. 5 and FIG. 6. FIG. 5 shows the spatial relationship between the specific block B1 adjacent blocks thereof, wherein the indexes of the top left, top right, bottom left, bottom right blocks of a specific block B1 are (i1, j1), (i2, j2), (i3, j3) and (i4, j4), respectively. The coordinate of the current pixel image is (x, y), and the equations of obtaining the block indexes may be referred as follows, wherein p and q are the length and width of the block.

$$i1 = \begin{cases} 0, & (x - p/2 < 0) \\ (x - p/2)/p, & \text{otherwise} \end{cases}$$

$$i2 = \begin{cases} 0, & (x - p/2 < 0) \\ (x - p/2)/p, & \text{otherwise} \end{cases}$$

$$i3 = \begin{cases} 0, & (x - p/2 < 0) \\ (x - p/2)/p + 1, & \text{otherwise} \end{cases}$$

$$i4 = \begin{cases} 0, & (x - p/2 < 0) \\ (x - p/2)/p + 1, & \text{otherwise} \end{cases}$$

$$j1 = \begin{cases} 0, & (y - q/2 < 0) \\ (y - q/2)/p + 1, & \text{otherwise} \end{cases}$$

$$j2 = \begin{cases} 0, & (y - q/2 < 0) \\ (y - q/2)/q + 1, & \text{otherwise} \end{cases}$$

$$j3 = \begin{cases} 0, & (y - q/2 < 0) \\ (y - q/2)/q, & \text{otherwise} \end{cases}$$

$$j4 = \begin{cases} 0, & (y - q/2 < 0) \\ (y - q/2)/q + 1, & \text{otherwise} \end{cases}$$

Figure 7:
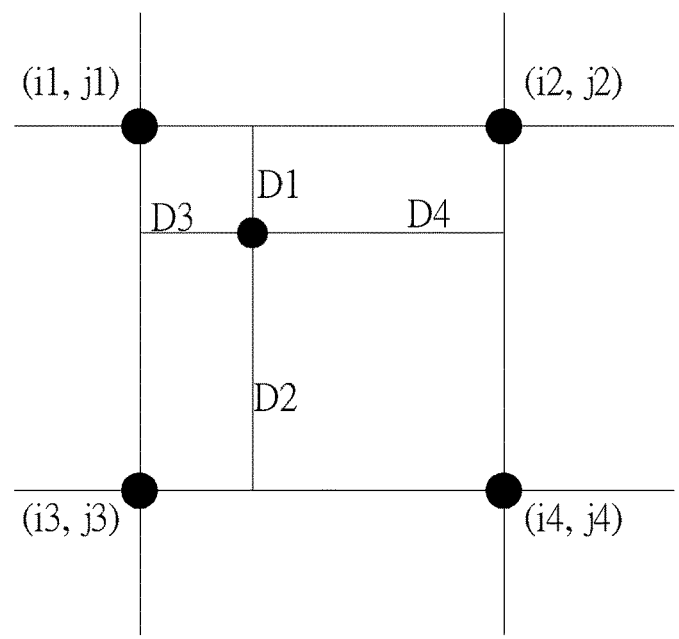
FIG. 7 shows an interpolation method for compensation parameters.

FIG. 6 shows an embodiment corresponding to FIG. 5, wherein the inner point (x, y) represents the current pixel, and the four points surrounding the inner point (x, y) represent the indexes of adjacent blocks. In this embodiment, i1=2, j1=3, i2=2, j2=4, i3=3, j3=3, i4=3, and j4=4. After obtaining the adjacent blocks, Step 308 can be executed for performing interpolation upon the compensation parameters, in order to obtain the final value of the compensation parameters of the current pixel. Please refer to FIG. 7, which shows an interpolation method for compensation parameters. As shown in FIG. 7, the interpolation will be performed between the current pixel (x, y) and the four vertexes of the adjacent blocks. The detailed approach is as follows:

(1) Calculate the vertical distances (i.e. the lengths of the normal lines) D1-D4 between the current pixel and any two adjacent vertexes, wherein D1-D4 are explicitly defined as follows:

D1: The distance between the current pixel and the line between the top left and top right vertexes (which can be realized as the shortest distance from the current pixel to the upper block);

D2: The distance between the current pixel and the line between the bottom left and bottom right vertexes (which can be realized as the shortest distance from the current pixel to the lower block);

D3: The distance between the current pixel and the line between the top left and bottom left vertexes (which can be realized as the shortest distance from the current pixel to the left block);

D4: The distance between the current pixel and the line between the top right and bottom right vertexes (which can be realized as the shortest distance from the current pixel to the right block);

(2) Interpolate current pixel compensation parameters according to distances. The detailed equations are as follow:

$$k1\_intp=(D2/(D1+D2))*(D4/(D3+D4))*k1(i1,j1)+(D2/(D1+D2))*(D3/(D3+D4))*k1(i2,j2)+(D1/(D1+D2))*(D4/(D3+D4))*k1(i3,j3)+(D1/(D1+D2))*(D3/(D3+D4))*k1(i4,j4);$$

$$k2\_intp=(D2/(D1+D2))*(D4/(D3+D4))*k2(i1,j1)+(D2/(D1+D2))*(D3/(D3+D4))*k2(i2,j2)+(D1/(D1+D2))*(D4/(D3+D4))*k2(i3,j3)+(D1/(D1+D2))*(D3/(D3+D4))*k2(i4,j4);$$

$$k3\_intp=(D2/(D1+D2))*(D4/(D3+D4))*k3(i1,j1)+(D2/(D1+D2))*(D3/(D3+D4))*k3(i2,j2)+(D1/(D1+D2))*(D4/(D3+D4))*k3(i3,j3)+(D1/(D1+D2))*(D3/(D3+D4))*k3(i4,j4).$$

wherein k1_intp(i, j), k2_intp(i, j) and k3_intp(i, j) are interpolated compensation parameters of the IR crosstalk of R, G, B of the block Block(i, j) respectively, k1, k2 and k3 are initial compensation coefficients corresponding to R, G, B respectively, (i1, j1), (i2, j2), (i3, j3) and (i4, j4) are the block indexes of the top left, top right, bottom left and bottom right blocks respectively. However, for the pixels of edge blocks or corner blocks, less than 4 vertexes will be used for interpolation. For example, the interpolation of pixels in a corner block only takes one vertex into account, and the interpolation of pixels in an edge block takes two vertexes into account.

Step 310 may be optional based on the actual requirements of the user, and thus may be viewed as further applying a user mode to adjust compensation parameters. In the following example, α1, α2 and α3 are corner adjustment parameters of R, G, B respectively, and are arranged to further perform a dynamic adjustment upon the compensation parameters based on the distance between the current block and the central block; β1, β2 and β3 are environment adjustment coefficients for further performing dynamic adjustment upon the obtained compensation parameters based on different scenes. The following equations can be derived when both scenes and location distribution are considered:

$$k1\_final=k1\_center+(k1\_intp-k1\_center)*\alpha1)*\beta1;$$

$$k2\_final=k2\_center+(k2\_intp-k2\_center)*\alpha2)*\beta2;$$

$$k3\_final=k3\_center+(k3\_intp-k3\_center)*\alpha3)*\beta3.$$

wherein k1_center, k2_center and k3_center are IR crosstalk compensation parameters of R, G, B of the central block, respectively.

In Step 312, the final compensation parameters are used to generate the output R, G and B values, which can be expressed by the following equations:

$$R(x,y)=R\_ori(x,y)-k1\_final*IR(x,y);$$

$$G(x,y)=G\_ori(x,y)-k2\_final*IR(x,y);$$

$$B(x,y)=B\_ori(x,y)-k3\_final*IR(x,y);$$

wherein R_final(x, y), G_final(x, y) and B_final(x, y) are the output R, G, B and IR values respectively, and R_ori(x, y), G_ori(x, y), B_ori(x, y) and IR (x, y) are the initially detected R, G, B and IR values.

In view of the above, the present invention provides a grid-based automatic calibration method for IR crosstalk compensation parameters, a grid-based IR crosstalk compensation method, and an IR crosstalk coefficient dynamic adjustment method. Accordingly, the present invention may effectively solve the problem encountered in prior art techniques that the IR crosstalk cannot be easily compensated. In addition, the method of the present invention can be implemented by either hardware or software.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adjustment method, comprising:
   receiving an image, and retrieving R, G and B values and an infrared ray (IR) value from the image;
   dividing the image into a plurality of blocks;
   generating initial compensation coefficients respectively corresponding to the R, G, B and IR values for each block within the blocks; and
   performing following operations upon each block within the blocks:
   adjusting initial compensation coefficients of a current block according to a plurality of adjacent blocks next to the current block, in order to generate adjusted compensation coefficients of the current block; and
   using the adjusted compensation coefficients of the current block to perform IR crosstalk compensation upon the current block.

2. The image adjustment method of claim 1, wherein the step of adjusting initial compensation coefficients of the current block according to the plurality of adjacent blocks next to the current block in order to generate adjusted compensation coefficients of the current block comprises:
   performing following operations upon each pixel within the current block:
   calculating distances between a current pixel and multiple adjacent blocks; and
   adjusting the initial compensation coefficients of the current pixel according to the distances between the current pixel and the adjacent blocks, in order to generate the adjusted compensation coefficients.

3. The image adjustment method of claim 2, wherein the step of adjusting the initial compensation coefficients of the current pixel according to the distances between the current pixel and the adjacent blocks in order to generate the adjusted compensation coefficients comprises:
   performing interpolation operations upon respective initial compensation coefficients of the adjacent blocks according to distances between the current pixel the adjacent blocks and an index pixel of each block, in order to generate the adjusted compensation coefficients of the current pixel.

4. The image adjustment method of claim 3, wherein the interpolation operations are presented as following equations:

$$k1\_intp=(D2/(D1+D2))*(D4/(D3+D4))*k1(i1,j1)+\\(D2/(D1+D2))*(D3/(D3+D4))*k1(i2,j2)+(D1/\\(D1+D2))*(D4/(D3+D4))*k1(i3,j3)+(D1/(D1+\\D2))*(D3/(D3+D4))*k1(i4,j4);$$

$$k2\_intp=(D2/(D1+D2))*(D4/(D3+D4))*k2(i1,j1)+\\(D2/(D1+D2))*(D3/(D3+D4))*k2(i2,j2)+(D1/\\(D1+D2))*(D4/(D3+D4))*k2(i3,j3)+(D1/(D1+\\D2))*(D3/(D3+D4))*k2(i4,j4); \text{ and}$$

$$k3\_intp=(D2/(D1+D2))*(D4/(D3+D4))*k3(i1,j1)+\\(D2/(D1+D2))*(D3/(D3+D4))*k3(i2,j2)+(D1/\\(D1+D2))*(D4/(D3+D4))*k3(i3,j3)+(D1/(D1+\\D2))*(D3/(D3+D4))*k3(i4,j4);$$

wherein k1_intp, k2_intp and k3_intp are adjusted compensation coefficients corresponding to R, G, B respectively, k1, k2 and k3 are the initial compensation coefficients corresponding to the R, G and B values respectively, (i1, j1), (i2, j2), (i3, j3) and (i4, j4) are block indexes of the top left, top right, bottom left and bottom right blocks, D1, D2, D3 and D4 are distances between the current pixel and the up, down, left and right blocks respectively.

5. The image adjustment method of claim 1, wherein the step of generating initial compensation coefficients respectively corresponding to the R, G, B and IR values for each block within the blocks comprises:
performing a color adjustment in order to respectively obtain IR images influenced by infrared ray and R, G, B images influenced by an infrared ray, and accordingly generating the initial compensation coefficients corresponding to the R, G and B values.

6. The image adjustment method of claim 1, wherein the step of adjusting the initial compensation coefficients of the current block according to the adjacent blocks next to the current block in order to generate the adjusted compensation coefficients of the current block comprises:
generating a corner adjustment parameter in response to distance between the current block and a central block with the blocks, in order to perform a dynamic adjustment upon the compensation coefficients.

7. The image adjustment method of claim 6, wherein the step of performing the dynamic adjustment upon the compensation coefficients further comprises:
generating an environment adjustment coefficient in response to the current environment, in order to further perform the dynamic adjustment upon the compensation coefficients.

8. The image adjustment method of claim 7, wherein equations of performing dynamic adjustment upon the compensation parameters are presented as follows:

$$k1\_final=k1\_center+(k1\_intp-k1\_center)*\alpha1*\beta1;$$

$$k2\_final=k2\_center+(k2\_intp-k2\_center)*\alpha2*\beta2; \text{ and}$$

$$k3\_final=k3\_center+(k3\_intp-k3\_center)*\alpha3*\beta3$$

wherein k1_intp, k2_intp and k3_intp are IR crosstalk interpolation compensation parameters corresponding to R, G, B respectively, and β1, β2, and β3 are environment adjustment coefficients respectively corresponding to R, G, B, k1_center, k2_center and k3_center are adjusted compensation coefficients respectively corresponding to R, G, B pixels in the central block, and α1, α2, and α3 are corner adjustment parameters respectively corresponding to R, G, B.

9. The image adjustment method of claim 8, wherein equations of using adjusted compensation coefficients of the current block to perform the IR crosstalk compensation upon the current block are presented as follows:

$$R\_final(x,y)=R\_ori(x,y)-k1\_final*IR(x,y);$$

$$G\_final(x,y)=G\_ori(x,y)-k2\_final*IR(x,y); \text{ and}$$

$$B\_final(x,y)=B\_ori(x,y)-k3\_final*IR(x,y);$$

wherein (x, y) are coordinate values of a pixel, R_final, G_final and B_final are output R, G and B values respectively, and R_ori, G_ori, B_ori and IR are the R, G, B and IR values respectively.

10. An image processing circuit, comprising:
a storage unit, arranged to temporarily store data; and
a processor, arranged to perform following operations:
receiving an image, and obtaining R, G and infrared ray (IR) values from the image;
dividing the image into multiple blocks;
generating initial compensation coefficients respectively corresponding to the R, G and B values for each block within the blocks; and
performing following operations upon each block within the blocks respectively:
adjusting an initial compensation coefficient of a current block according to respective initial compensation coefficients of multiple adjacent blocks surrounding the current block, in order to generate adjusted compensation coefficients of the current block; and
using the adjusted compensation coefficients of the current block to perform IR crosstalk compensation upon the current block.

11. The image processing circuit of claim 10, wherein the step of adjusting an initial compensation coefficient of the current block according to respective initial compensation coefficients of the multiple adjacent blocks surrounding the current block in order to generate the adjusted compensation coefficients of the current block comprises:
performing following operations upon each pixel with the current block:
calculating multiple distance between the current pixel and multiple adjacent blocks respectively; and
performing adjustment upon the initial compensation coefficient of the current pixel according to the distances between the current pixel and the adjacent blocks, in order to generate the adjusted compensation coefficients.

12. The image processing circuit of claim 10, wherein the step of adjusting the initial compensation coefficient of the current block according to respective initial compensation coefficients of the multiple adjacent blocks surrounding the current block in order to generate the adjusted compensation coefficients of the current block comprises:
performing interpolation upon respective initial compensation coefficients of the adjacent blocks according to the distance between the current pixel and an index pixel of each block within the adjacent blocks, in order to generate the adjusted compensation coefficients of the current pixel.

13. The image processing circuit of claim 12, wherein the interpolation is presented as following equations:

$$k1\_intp=(D2/(D1+D2))*(D4/(D3+D4))*k1(i1,j1)+\\(D2/(D1+D2))*(D3/(D3+D4))*k1(i2,j2)+(D1/$$

$$(D1+D2))*(D4/(D3+D4))*k1(i3,j3)+(D1/(D1+D2))*(D3/(D3+D4))*k1(i4,j4);$$

$$k2\_intp=(D2/(D1+D2))*(D4/(D3+D4))*k2(i1,j1)+(D2/(D1+D2))*(D3/(D3+D4))*k2(i2,j2)+(D1/(D1+D2))*(D4/(D3+D4))*k2(i3,j3)+(D1/(D1+D2))*(D3/(D3+D4))*k2(i4,j4); \text{ and}$$

$$k3\_intp=(D2/(D1+D2))*(D4/(D3+D4))*k3(i1,j1)+(D2/(D1+D2))*(D3/(D3+D4))*k3(i2,j2)+(D1/(D1+D2))*(D4/(D3+D4))*k3(i3,j3)+(D1/(D1+D2))*(D3/(D3+D4))*k3(i4,j4);$$

wherein k1_intp, k2_intp and k3_intp are adjusted compensation coefficients corresponding to R, G, B respectively, k1, k2 and k3 are the initial compensation coefficients corresponding to R, G, B respectively, (i1, j1), (i2, j2), (i3, j3) and (i4, j4) are block indexes of the top left, top right, bottom left and bottom right blocks within the adjacent blocks respectively, and D1, D2, D3 and D4 are distances between the current pixel and the up, down, left and right blocks within the adjacent blocks, respectively.

14. The image processing circuit of claim 10, wherein the step of generating the initial compensation coefficients respectively corresponding to the R, G and B values for each block within the blocks further comprises:

performing color adjustment in order to respectively obtain IR images influenced by infrared ray and R, G, B images influenced by an infrared ray, in order to generate the initial compensation coefficients corresponding to the R, G and B values.

15. The image processing circuit of claim 10, wherein the step of adjusting the initial compensation coefficient of the current block according to the respective initial compensation coefficients of the adjacent blocks surrounding the current block in order to generate the adjusted compensation coefficients of the current block comprises:

generating a corner adjustment parameter in response to a distance between the current block and a central block with the blocks, in order to perform a dynamic adjustment upon the compensation coefficients.

16. The image processing circuit of claim 15, wherein the step of performing the dynamic adjustment upon the compensation coefficients further comprises:

generating an environment adjustment coefficient in response to the current environment, in order to perform the dynamic adjustment upon the compensation coefficients.

17. The image processing circuit of claim 16, wherein equations of $$k1\_final=k1\_center+(k1\_intp-k1\_center)*\alpha1*\beta1;$$

$$k2\_final=k2\_center+(k2\_intp-k2\_center)*\alpha2*\beta2; \text{ and}$$

$$k3\_final=k3\_center+(k3\_intp-k3\_center)*\alpha3*\beta3$$

wherein k1_intp, k2_intp and k3_intp are IR crosstalk interpolation compensation parameters corresponding to R, G, B respectively, and $\beta1$, $\beta2$, and $\beta3$ are environment adjustment coefficients respectively corresponding to R, G, B, k1_center, k2_center and k3_center are adjusted compensation coefficients respectively corresponding to R, G, B pixels in the central block, and $\alpha1$, $\alpha2$ and $\alpha3$ are corner adjustment parameters respectively corresponding to R, G, B.

18. The image processing circuit of claim 17, wherein equations of using adjusted compensation coefficients of the current block to the perform IR crosstalk compensation upon the current block are presented as follows:

$$R\_final(x,y)=R\_ori(x,y)-k1\_final*IR(x,y);$$

$$G\_final(x,y)=G\_ori(x,y)-k2\_final*IR(x,y); \text{ and}$$

$$B\_final(x,y)=B\_ori(x,y)-k3\_final*IR(x,y);$$

wherein (x, y) are coordinate values of a pixel, R_final, G_final and B_final are output R, G and B values respectively, and R_ori, G_ori, B_ori and IR are the R, G, B and IR values respectively.

* * * * *